(12) United States Patent
Ajith Kumar et al.

(10) Patent No.: US 9,021,428 B2
(45) Date of Patent: Apr. 28, 2015

(54) TROUBLESHOOTING VISUALS AND TRANSIENT EXPRESSIONS IN EXECUTING APPLICATIONS

(71) Applicant: Microsoft Corporation, Redmond, WA (US)

(72) Inventors: Harikrishna Menon Ajith Kumar, Bellevue, WA (US); Kenneth Lawrence Young, Sammamish, WA (US); Unnikrishnan Ravindranathan, Issaquah, WA (US); Christian Schormann, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 56 days.

(21) Appl. No.: 13/904,473

(22) Filed: May 29, 2013

(65) Prior Publication Data

US 2014/0359573 A1    Dec. 4, 2014

(51) Int. Cl.

| | |
|---|---|
| G06F 9/44 | (2006.01) |
| G06F 3/048 | (2013.01) |
| G06F 11/36 | (2006.01) |
| G06F 17/22 | (2006.01) |
| G06F 9/445 | (2006.01) |
| G06F 17/24 | (2006.01) |

(52) U.S. Cl.
CPC ........ *G06F 11/3612* (2013.01); *G06F 17/2247* (2013.01); *G06F 8/34* (2013.01); *G06F 8/67* (2013.01); *G06F 17/241* (2013.01); *G06F 11/3664* (2013.01); *G06F 8/33* (2013.01)

(58) Field of Classification Search
None
See application file for complete search history.

(56) References Cited

U.S. PATENT DOCUMENTS

| | | | | |
|---|---|---|---|---|
| 5,732,210 | A  | * | 3/1998 | Buzbee ..................... 714/38.13 |
| 5,781,776 | A  | * | 7/1998 | Johnston et al. ............. 717/130 |
| 7,017,151 | B1 | * | 3/2006 | Lopez et al. ................. 717/127 |
| 8,020,148 | B2 | * | 9/2011 | Robertsson ................... 717/124 |
| 8,091,016 | B2 |   | 1/2012 | Winkler et al. |

(Continued)

OTHER PUBLICATIONS

Hartmann, B., et al., Design as exploration: creating interface alternatives through parallel authoring and runtime tuning, Proceedings of the 21st annual ACM symposium on User interface software and technology, 2008, pp. 91-100, [retrieved on Dec. 18, 2014], Retrieved from the Internet: <URL:http://dl.acm.org/>.*

(Continued)

*Primary Examiner* — Thuy Dao
*Assistant Examiner* — Geoffrey St Leger
(74) *Attorney, Agent, or Firm* — Kevin Sullivan; Kate Drakos; Micky Minhas

(57) ABSTRACT

Tools and techniques support troubleshooting live application visuals, including transient markup expression issues in XAML or HTML. A LADRT module supports troubleshooting without pausing application execution to help inspect and modify visual construct properties, and to identify and alter source code pertaining to a selected visual construct. Changes are serialized back to the application program source code and reflected in real time in the executing application, without a rebuild. Markup annotation preserves pre-evaluation versions of markup expressions for binding, static resource identification, and custom purposes. Markup annotation also correlates visual constructs and source code. The LADRT module operates independently of debuggers, and may autoload with the application. Program project and source code changes are not required for troubleshooting capability.

20 Claims, 5 Drawing Sheets

(56) References Cited

U.S. PATENT DOCUMENTS

| | | | |
|---|---|---|---|
| 2005/0076330 A1* | 4/2005 | Almgren et al. | 717/113 |
| 2006/0174199 A1* | 8/2006 | Soltis et al. | 715/700 |
| 2008/0216054 A1* | 9/2008 | Bates et al. | 717/125 |
| 2009/0288069 A1 | 11/2009 | Kent et al. | |
| 2009/0327883 A1 | 12/2009 | Robertson et al. | |
| 2010/0011341 A1* | 1/2010 | Baierl et al. | 717/110 |
| 2010/0017700 A1* | 1/2010 | Odean et al. | 715/230 |
| 2010/0064208 A1* | 3/2010 | Valtchev | 715/234 |
| 2012/0131558 A1* | 5/2012 | Bates et al. | 717/129 |
| 2013/0067322 A1 | 3/2013 | Gould et al. | |
| 2014/0026115 A1* | 1/2014 | Bank et al. | 717/113 |
| 2014/0250423 A1* | 9/2014 | Voliter | 717/113 |
| 2014/0304682 A1* | 10/2014 | Taylor et al. | 717/113 |
| 2014/0325349 A1* | 10/2014 | Riherd et al. | 715/255 |

OTHER PUBLICATIONS

McDirmid, S., Living it up with a live programming language, ACM SIGPLAN Notices—Proceedings of the 2007 OOPSLA conference, vol. 42 Issue 10, Oct. 2007, pp. 623-638, [retrieved on Dec. 18, 2014], Retrieved from the Internet: <URL:http://dl.acm.org/>.*

Zwikstra, Koen, "XAML Spy", Published on: Sep. 8, 2012, 1 Page, Retrieved from: http://visualstudiogallery.msdn.microsoft.com/b72693d0-8c8b-467d-8a84-f4024ce6869a.

"Snoop 2.8.0", Published on: Oct. 4, 2012, 2 Pages, Retrieved from: http://snoopwpf.codeplex.com/releases/view/87261.

"Snoop (a WPF utility)", Published on: Oct. 30, 2006, 5 Pages, Retrieved from: http://blois.us/Snoop/.

"Chrome DevTools—Google Developers", Published on: Apr. 5, 2013, 6 Pages, Retrieved from: https://developers.google.com/chrome-developer-tools/.

"Declarative programming", Published on: May 7, 2013, 4 Pages, Retrieved from: http://en.wikipedia.org/wiki/Declarative_programming.

"Extensible Application Markup Language", Published on: Mar. 20, 2013, 4 Pages, Retrieved from: https://en.wikipedia.org/wiki/XAML.

"Introduction to F12 Developer Tools", Published on: Nov. 20, 2012, 5 Pages, Retrieved from: http://msdn.microsoft.com/en-us/library/ie/gg589512(v=vs.85).aspx.

"XAML Overview (WPF)", Published no later than: May 10, 2013, 16 Pages, Retrieved from: http://msdn.microsoft.com/en-us/library/ms752059.aspx.

* cited by examiner

TROUBLESHOOTING VISUALS AND TRANSIENT EXPRESSIONS IN EXECUTING APPLICATIONS

BACKGROUND

In software development, declarative programming is an approach which expresses computational logic without fully describing control flow, as opposed to imperative programming, which describes a step-by-step flow of control. Informally, declarative programming explicitly describes a result a program is attempting to provide by declaring the result, whereas imperative programming describes a result implicitly by stating the steps being taken to produce the result. A given program can contain, and often does contain, both declarative and imperative portions.

Some examples of declarative programming languages include markup languages. Two prominent markup languages are HyperText Markup Language ("HTML") and eXtensible Application Markup Language ("XAML"). Among other uses, XAML and HTML and other markup languages can be used to define visible elements of an application program's User Interface ("UI"), such as borders, buttons, geometric shapes, panels, text boxes, viewers, and many other visible elements or their properties. Using markup code to help define a UI facilitates separation of an application into a UI portion and an underlying business logic portion. This separation in turn makes it possible for one development team to work on the UI while a different development team works on the business logic.

SUMMARY

Some embodiments are directed to the technical problem of troubleshooting an issue in an application's visuals when the issue is difficult or tedious to reproduce reliably while running the application's code in a designer tool. Some embodiments are directed to the technical problem of troubleshooting an issue in an application visual when the issue involves a markup expression whose content is changed by the very act of running the application to diagnose the issue. Some embodiments are directed to the technical problem of troubleshooting an issue in an application visual without repeated and disruptive switches in a developer's focus between diagnosing the issue and editing application source code to resolve the issue.

Some embodiments provide an architecture for troubleshooting executing applications, which are also referred to herein as live applications or as running applications. The architecture includes a display, at least one logical processor, and a memory in operable communication with the logical processor(s). An application program resides at least partially in the memory and during a period of interest is being executed by the logical processor; it is thus a live, running, executing application. A markup has been or is being loaded in the memory by the application program, such as a XAML or HTML markup. An application visual rendered on the display includes at least one visual construct defined by the markup.

In this architecture, a live authoring diagnostics round trip module ("LADRT module") includes code for execution by the logical processor to provide troubleshooting functionality without pausing execution of the application program (that is, without requiring a debugger or other breakpoint tool, and without exiting or halting the application program). Specifically, in some embodiments the LADRT module includes the following: (a) a visual construct property inspection functionality code which upon execution inspects at least one property of at least one visual construct; (b) a visual construct property modification functionality code which upon execution modifies at least one property of at least one visual construct; (c) a source code identification functionality code which upon execution identifies an application program source code that pertains to a selected visual construct; and (d) a source code alteration functionality code which upon execution alters application program source code that is identified as pertaining to the visual construct. A source code is said to pertain to the visual construct when the source code specifies at least one of the following: creation of the visual construct, modification of the visual construct.

In some embodiments, the LADRT module includes code which upon execution makes an alteration to the application visual within the application program while the full application program is executing (live, not in a designer). The change is serialized back to the application program source code by the source code alteration functionality, thus helping developers stay focused.

Some embodiments include an integrated development environment (IDE), and the LADRT module includes code which upon execution makes an alteration to the application visual within the application program within the IDE while the live application program is executing. The change is reflected in real time in the executing application program, thus helping developers stay focused.

Some embodiments include a markup annotation which correlates the visual construct with a markup representing the visual construct. In some embodiments, the markup includes XAML code, or HTML code, or both. In some, a markup annotation preserves a pre-evaluation version of an expression in the markup that was subsequently replaced by an evaluated version of the expression during execution of the application, such as a binding expression, an expression which points to a resource, or a custom expression written by an application developer, for example. Storing and using pre-evaluation versions helps developers diagnose application visual issues which involve transient expressions.

In some situations, a debugger tool and/or a source code editor tool are also present, but they operate concurrently and independently of the LADRT module, in the sense that LADRT module functionality does not require their presence and their functionality does not require the presence of the LADRT module. For convenience, the LADRT module may be automatically loaded in conjunction with commencing execution of the full application program.

Some embodiments provide steps for troubleshooting an executing application outside a designer. Some embodiments modify a property of a visual construct of an application visual of the application program while the application program is executing, without pausing execution of the application program, thereby creating a property modification. The visual construct is defined by an application markup, such as a XAML or HTML markup, for instance. The embodiments identify source code to be altered by using a markup annotation which correlates the visual construct with a portion of the markup representing the visual construct. Then they persist the property modification into a source code alteration of the application program while the application program is executing, without pausing execution of the application. Some embodiments reflect the source code alteration in the executing application without rebuilding the application, thus promoting steady developer focus on the visuals. Markup annotations are made before the application program begins executing.

In some embodiments, troubleshooting while executing the application differs from running a designer because in executing the application all code of the application defined by a developer of the application (i.e., full application code) is accessible to the processor, whereas in running a designer one or more data types in the code of the application defined by the developer would be replaced by designer data types, e.g., to facilitate editing.

Troubleshooting can be performed in some embodiments without requiring an application program project change. Although source code may be changed to resolve issues diagnosed using the LADRT module, the LADRT module itself can be loaded and used without requiring an application program source code change to make its functionalities available to a developer.

Some embodiments troubleshoot a transient expression in the markup while the application program is executing, by using a pre-evaluation version of the transient expression that was subsequently replaced by an evaluated version while the application program is executing. Examples of transient expressions are given above. In some embodiments, troubleshooting includes locating a transient expression in a markup, storing in a digital memory (in an annotation store, for instance) a copy of the transient expression prior to evaluating the transient expression, commencing execution of the full application program by at least one processor in a computing environment, evaluating the transient expression of the markup to support execution of the application program (thus replacing the located transient expression by an evaluated expression), inspecting at least one property of at least one visual construct which is defined by the markup, and using the stored transient expression. For example, the stored transient expression can be used by displaying it within a software tool based on the LADRT module, thereby providing information about the markup during execution of the application program even though the information is not presently available in the executing application program.

The examples given are merely illustrative. This Summary is not intended to identify key features or essential features of the claimed subject matter, nor is it intended to be used to limit the scope of the claimed subject matter. Rather, this Summary is provided to introduce—in a simplified form—some technical concepts that are further described below in the Detailed Description. The innovation is defined with claims, and to the extent this Summary conflicts with the claims, the claims should prevail.

DESCRIPTION OF THE DRAWINGS

A more particular description will be given with reference to the attached drawings. These drawings only illustrate selected aspects and thus do not fully determine coverage or scope.

DETAILED DESCRIPTION

Overview

Figure 1:
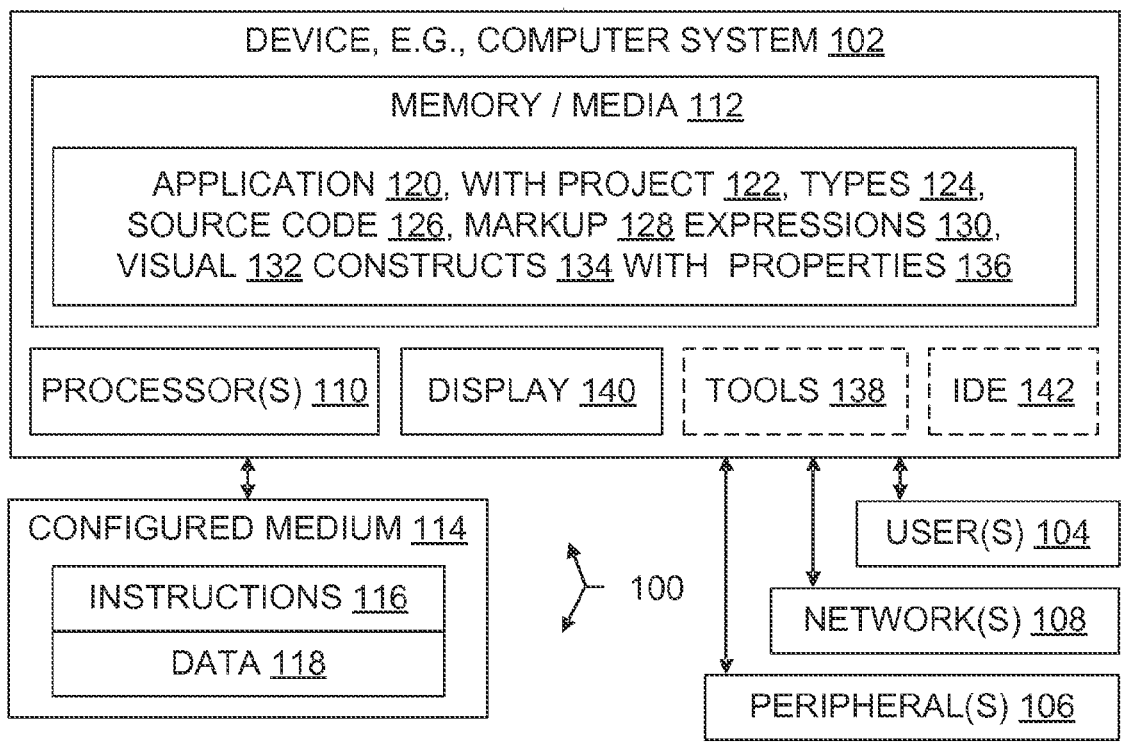
FIG. 1 is a block diagram illustrating a computer system having at least one processor and at least one memory which interact with one another under the control of software for troubleshooting application visuals, and other items in an operating environment which may be present on multiple network nodes, and also illustrating configured storage medium (as opposed to a mere signal) embodiments.

What-you-see-is-what-you-get (WYSIWYG) is sometimes an overly optimistic description of a software development tool. Some software application visual issues can only be reliably and efficiently reproduced in the context of a specific resolution, a specific device type, and/or other live environment specifics. The behavior seen when running part of an application in a WYSIWYG designer will not necessarily be the same behavior one would see when running the full application live. Some application behavior or performance issues are difficult or (as a practical matter) impossible to simulate in a WYSIWYG design surface, because emulating all the live variables in the context of a designer is prohibitive in terms of performance and cost. Implementing a designer that can simulate the target environment to perfection is not always feasible. This development challenge can be further complicated by the fact that once a markup is loaded into an application runtime, expression evaluation often leads to lossy translation of user constructs by the underlying platform, thus making correlation between user code and the application visual very difficult.

Although some familiar tools permit a developer to connect a property viewer with a live running application to view runtime values of properties of visual constructs, these tools do not help troubleshoot issues with transient expressions such as binding expressions. Nor do these familiar tools correlate visual constructs in application visuals back to their representation in the developer's source code. One can inspect properties of visual constructs and modify them in place, but these changes do not persist back to source. Instead, developers try to remember the property changes they have made and then formulate and make corresponding fixes in their source. The views for editing these visuals are also hosted outside the running application, which hampers focus by making developers switch back and forth between a property viewer and a code editor.

Some embodiments described herein provide round-tripping support, such as the ability to modify application visuals from within the running application and have these changes serialize back to the source. Some provide round-trip support from an integrated development environment (IDE), namely, the ability to modify visuals in the IDE and have these changes reflect in real time in the running application.

Some embodiments described herein provide an annotations store, namely, annotations to markup which can be used for troubleshooting during application execution. These annotations can be used to evaluate transient values and expressions in markup, for example, and/or used to correlate visual constructs with their markup representation in the developer's source.

Some embodiments described herein may be viewed in a broader context. For instance, concepts such as expression evaluation, markup annotation, property inspection, property modification, and source code alteration may be relevant to a particular embodiment. However, it does not follow from the availability of a broad context that exclusive rights are being sought herein for abstract ideas; they are not. Rather, the present disclosure is focused on providing appropriately specific embodiments whose technical effects fully or partially solve particular technical problems. Other media, systems, and methods involving expression evaluation, markup annotation, property inspection, property modification, and/or source code alteration are outside the present scope. Accordingly, vagueness, mere abstractness, lack of technical character, and accompanying proof problems are also avoided under a proper understanding of the present disclosure.

The technical character of embodiments described herein will be apparent to one of ordinary skill in the art, and will also be apparent in several ways to a wide range of attentive readers. First, some embodiments address technical problems such as troubleshooting application visual issues that do not occur reliably in a designer and/or involve a transient expression. Second, some embodiments include technical components such as computing hardware which interacts with software in a manner beyond the typical interactions within a general purpose computer. For example, in addition to normal interaction such as memory allocation in general, memory reads and write in general, instruction execution in general, and some sort of I/O, some embodiments described herein provide an LADRT module. Third, technical effects and adaptations provided by some embodiments include markup annotations that store transient expressions, markup annotations that correlate visual construct properties with source code, and/or coordinated property and source code alterations without an application rebuild. Fourth, technical advantages of some embodiments include improved application visuals troubleshooting usability, lower error rates in altering source code to match visual construct property modifications, simplified application user interface development, and improved support for developers who are primarily guided by application visuals rather than being guided by textual source code.

Reference will now be made to exemplary embodiments such as those illustrated in the drawings, and specific language will be used herein to describe the same. But alterations and further modifications of the features illustrated herein, and additional technical applications of the abstract principles illustrated by particular embodiments herein, which would occur to one skilled in the relevant art(s) and having possession of this disclosure, should be considered within the scope of the claims.

The meaning of terms is clarified in this disclosure, so the claims should be read with careful attention to these clarifications. Specific examples are given, but those of skill in the relevant art(s) will understand that other examples may also fall within the meaning of the terms used, and within the scope of one or more claims. Terms do not necessarily have the same meaning here that they have in general usage (particularly in non-technical usage), or in the usage of a particular industry, or in a particular dictionary or set of dictionaries. Reference numerals may be used with various phrasings, to help show the breadth of a term. Omission of a reference numeral from a given piece of text does not necessarily mean that the content of a Figure is not being discussed by the text. The inventors assert and exercise their right to their own lexicography. Quoted terms are defined explicitly, but quotation marks are not used when a term is defined implicitly. Terms may be defined, either explicitly or implicitly, here in the Detailed Description and/or elsewhere in the application file.

As used herein, a "computer system" may include, for example, one or more servers, motherboards, processing nodes, personal computers (portable or not), personal digital assistants, smartphones, cell or mobile phones, other mobile devices having at least a processor and a memory, and/or other device(s) providing one or more processors controlled at least in part by instructions. The instructions may be in the form of firmware or other software in memory and/or specialized circuitry. In particular, although it may occur that many embodiments run on workstation or laptop computers, other embodiments may run on other computing devices, and any one or more such devices may be part of a given embodiment.

A "multithreaded" computer system is a computer system which supports multiple execution threads. The term "thread" should be understood to include any code capable of or subject to scheduling (and possibly to synchronization), and may also be known by another name, such as "task," "process," or "coroutine," for example. The threads may run in parallel, in sequence, or in a combination of parallel execution (e.g., multiprocessing) and sequential execution (e.g., time-sliced). Multithreaded environments have been designed in various configurations. Execution threads may run in parallel, or threads may be organized for parallel execution but actually take turns executing in sequence. Multithreading may be implemented, for example, by running different threads on different cores in a multiprocessing environment, by time-slicing different threads on a single processor core, or by some combination of time-sliced and multi-processor threading. Thread context switches may be initiated, for example, by a kernel's thread scheduler, by user-space signals, or by a combination of user-space and kernel operations. Threads may take turns operating on shared data, or each thread may operate on its own data, for example.

A "logical processor" or "processor" is a single independent hardware thread-processing unit, such as a core in a simultaneous multithreading implementation. As another example, a hyperthreaded quad core chip running two threads per core has eight logical processors. A logical processor includes hardware. The term "logical" is used to prevent a mistaken conclusion that a given chip has at most one processor; "logical processor" and "processor" are used interchangeably herein. Processors may be general purpose, or they may be tailored for specific uses such as graphics processing, signal processing, floating-point arithmetic processing, encryption, I/O processing, and so on.

A "multiprocessor" computer system is a computer system which has multiple logical processors. Multiprocessor environments occur in various configurations. In a given configuration, all of the processors may be functionally equal, whereas in another configuration some processors may differ from other processors by virtue of having different hardware capabilities, different software assignments, or both. Depending on the configuration, processors may be tightly coupled to each other on a single bus, or they may be loosely coupled. In some configurations the processors share a central memory, in some they each have their own local memory, and in some configurations both shared and local memories are present.

"Kernels" include operating systems, hypervisors, virtual machines, BIOS code, and similar hardware interface software.

"Code" means processor instructions, data (which includes constants, variables, and data structures), or both instructions and data.

"Program" is used broadly herein, to include applications, kernels, drivers, interrupt handlers, libraries, and other code written by programmers (who are also referred to as developers).

As used herein, "include" allows additional elements (i.e., includes means comprises) unless otherwise stated. "Consists of" means consists essentially of, or consists entirely of. X consists essentially of Y when the non-Y part of X, if any, can be freely altered, removed, and/or added without altering the functionality of claimed embodiments so far as a claim in question is concerned.

"Process" is sometimes used herein as a term of the computing science arts, and in that technical sense encompasses resource users, namely, coroutines, threads, tasks, interrupt handlers, application processes, kernel processes, procedures, and object methods, for example. "Process" is also used herein as a patent law term of art, e.g., in describing a process claim as opposed to a system claim or an article of manufacture (configured storage medium) claim. Similarly, "method" is used herein at times as a technical term in the computing science arts (a kind of "routine") and also as a patent law term of art (a "process"). Those of skill will understand which meaning is intended in a particular instance, and will also understand that a given claimed process or method (in the patent law sense) may sometimes be implemented using one or more processes or methods (in the computing science sense).

"Automatically" means by use of automation (e.g., general purpose computing hardware configured by software for specific operations and technical effects discussed herein), as opposed to without automation. In particular, steps performed "automatically" are not performed by hand on paper or in a person's mind, although they may be initiated by a human person or guided interactively by a human person. Automatic steps are performed with a machine in order to obtain one or more technical effects that would not be realized without the technical interactions thus provided.

One of skill understands that technical effects are the presumptive purpose of a technical embodiment. The mere fact that calculation is involved in an embodiment, for example, and that some calculations can also be performed without technical components (e.g., by paper and pencil, or even as mental steps) does not remove the presence of the technical effects or alter the concrete and technical nature of the embodiment. For example, certain familiar devices perform balance calculations to maintain their balance; some examples include mobile robots and SEGWAY® wheeled personal mobility devices (mark of Segway, Inc.). These devices are not part of the embodiments described herein but they illustrate the point that technical effects are provided by technical components, not by mere mental steps. Balance calculations simply cannot be performed rapidly enough by mental steps or by paper and pencil to provide the balance that is present in many mobile robots or wheeled personal mobility devices. The technical effect of having a dynamically balanced device is thus provided by technical components which include a processor and a memory interacting with balance control software.

"Computationally" likewise means a computing device (processor plus memory, at least) is being used, and excludes obtaining a result by mere human thought or mere human action alone. For example, doing arithmetic with a paper and pencil is not doing arithmetic computationally as understood herein. Computational results are faster, broader, deeper, more accurate, more consistent, more comprehensive, and/or otherwise provide technical effects that are beyond the scope of human performance alone. "Computational steps" are steps performed computationally. Neither "automatically" nor "computationally" necessarily means "immediately". "Computationally" and "automatically" are used interchangeably herein.

"Proactively" means without a direct request from a user. Indeed, a user may not even realize that a proactive step by an embodiment was possible until a result of the step has been presented to the user. Except as otherwise stated, any computational and/or automatic step described herein may also be done proactively.

Throughout this document, use of the optional plural "(s)", "(es)", or "(ies)" means that one or more of the indicated feature is present. For example, "processor(s)" means "one or more processors" or equivalently "at least one processor".

Throughout this document, unless expressly stated otherwise any reference to a step in a process presumes that the step may be performed directly by a party of interest and/or performed indirectly by the party through intervening mechanisms and/or intervening entities, and still lie within the scope of the step. That is, direct performance of the step by the party of interest is not required unless direct performance is an expressly stated requirement. For example, a step involving action by a party of interest such as altering, annotating, authoring, binding, changing, commencing, communicating, creating, diagnosing, displaying, editing, evaluating, executing, identifying, inspecting, loading, locating, modifying, operating, pointing, persisting, preserving, rebuilding, reflecting, rendering, replacing, running, serializing, storing, troubleshooting, using (or alters, altered, annotates, annotated, etc.) with regard to a destination or other subject may involve intervening action such as forwarding, copying, uploading, downloading, encoding, decoding, compressing, decompressing, encrypting, decrypting, authenticating, invoking, and so on by some other party, yet still be understood as being performed directly by the party of interest.

Whenever reference is made to data or instructions, it is understood that these items configure a computer-readable memory and/or computer-readable storage medium, thereby transforming it to a particular article, as opposed to simply existing on paper, in a person's mind, or as a mere signal being propagated on a wire, for example. Unless expressly stated otherwise in a claim, a claim does not cover a signal per se. A memory or other computer-readable storage medium is not a propagating signal or a carrier wave outside the scope of patentable subject matter under United States Patent and Trademark Office (USPTO) interpretation of the In re *Nuijten* case.

Moreover, notwithstanding anything apparently to the contrary elsewhere herein, a clear distinction is to be understood between (a) computer readable storage media and computer readable memory, on the one hand, and (b) transmission media, also referred to as signal media, on the other hand. A transmission medium is a propagating signal or a carrier wave computer readable medium. By contrast, computer readable storage media and computer readable memory are not propagating signal or carrier wave computer readable media. Unless expressly stated otherwise, "computer readable medium" means a computer readable storage medium, not a propagating signal per se.

Operating Environments

With reference to FIG. 1, an operating environment 100 for an embodiment may include a computer system 102. The computer system 102 may be a multiprocessor computer system, or not. An operating environment may include one or more machines in a given computer system, which may be clustered, client-server networked, and/or peer-to-peer networked. An individual machine is a computer system, and a group of cooperating machines is also a computer system. A given computer system 102 may be configured for end-users, e.g., with applications, for administrators, as a server, as a distributed processing node, and/or in other ways.

Human users 104 may interact with the computer system 102 by using displays, keyboards, and other peripherals 106, via typed text, touch, voice, movement, computer vision, gestures, and/or other forms of I/O. A user interface may support interaction between an embodiment and one or more human users. A user interface may include a command line interface, a graphical user interface (GUI), natural user interface (NUI), voice command interface, and/or other interface presentations. A user interface may be generated on a local desktop computer, or on a smart phone, for example, or it may be generated from a web server and sent to a client. The user interface may be generated as part of a service and it may be integrated with other services, such as social networking services. A given operating environment includes devices and infrastructure which support these different user interface generation options and uses.

Natural user interface (NUI) operation may use speech recognition, touch and stylus recognition, gesture recognition both on screen and adjacent to the screen, air gestures, head and eye tracking, voice and speech, vision, touch, gestures, and/or machine intelligence, for example. Some examples of NUI technologies include touch sensitive displays, voice and speech recognition, intention and goal understanding, motion gesture detection using depth cameras (such as stereoscopic camera systems, infrared camera systems, RGB camera systems and combinations of these), motion gesture detection using accelerometers/gyroscopes, facial recognition, 3D displays, head, eye, and gaze tracking, immersive augmented reality and virtual reality systems, all of which provide a more natural interface, as well as technologies for sensing brain activity using electric field sensing electrodes (electroencephalograph and related tools).

One of skill will appreciate that the foregoing aspects and other aspects presented herein under "Operating Environments" may also form part of a given embodiment. This document's headings are not intended to provide a strict classification of features into embodiment and non-embodiment feature classes.

As another example, a game may be resident on a Microsoft XBOX Live® server (mark of Microsoft Corporation). The game may be purchased from a console and it may be executed in whole or in part on the server, on the console, or both. Multiple users may interact with the game using standard controllers, air gestures, voice, or using a companion device such as a smartphone or a tablet. A given operating environment includes devices and infrastructure which support these different use scenarios.

System administrators, developers, engineers, and end-users are each a particular type of user 104. Automated agents, scripts, playback software, and the like acting on behalf of one or more people may also be users 104. Storage devices and/or networking devices may be considered peripheral equipment in some embodiments. Other computer systems not shown in FIG. 1 may interact in technological ways with the computer system 102 or with another system embodiment using one or more connections to a network 108 via network interface equipment, for example.

The computer system 102 includes at least one logical processor 110. The computer system 102, like other suitable systems, also includes one or more computer-readable storage media 112. Media 112 may be of different physical types. The media 112 may be volatile memory, non-volatile memory, fixed in place media, removable media, magnetic media, optical media, and/or of other types of physical durable storage media (as opposed to merely a propagated signal). In particular, a configured medium 114 such as a CD, DVD, memory stick, or other removable non-volatile memory medium may become functionally a technological part of the computer system when inserted or otherwise installed, making its content accessible for interaction with and use by processor 110. The removable configured medium 114 is an example of a computer-readable storage medium 112. Some other examples of computer-readable storage media 112 include built-in RAM, ROM, hard disks, and other memory storage devices which are not readily removable by users 104. Neither a computer-readable medium nor a computer-readable memory includes a signal per se.

The medium 114 is configured with instructions 116 that are executable by a processor 110; "executable" is used in a broad sense herein to include machine code, interpretable code, bytecode, and/or code that runs on a virtual machine, for example. The medium 114 is also configured with data 118 which is created, modified, referenced, and/or otherwise used for technical effect by execution of the instructions 116. The instructions 116 and the data 118 configure the memory or other storage medium 114 in which they reside; when that memory or other computer readable storage medium is a functional part of a given computer system, the instructions 116 and data 118 also configure that computer system. In some embodiments, a portion of the data 118 is representative of real-world items such as product characteristics, inventories, physical measurements, settings, images, readings, targets, volumes, and so forth. Such data is also transformed by backup, restore, commits, aborts, reformatting, and/or other technical operations.

Although an embodiment may be described as being implemented as software instructions executed by one or more processors in a computing device (e.g., general purpose computer, cell phone, or gaming console), such description is not meant to exhaust all possible embodiments. One of skill will understand that the same or similar functionality can also often be implemented, in whole or in part, directly in hardware logic, to provide the same or similar technical effects. Alternatively, or in addition to software implementation, the technical functionality described herein can be performed, at least in part, by one or more hardware logic components. For example, and without excluding other implementations, an embodiment may include hardware logic components such as Field-Programmable Gate Arrays (FPGAs), Application-Specific Integrated Circuits (ASICs), Application-Specific Standard Products (ASSPs), System-on-a-Chip components (SOCs), Complex Programmable Logic Devices (CPLDs), and similar components. Components of an embodiment may be grouped into interacting functional modules based on their inputs, outputs, and/or their technical effects, for example.

In the illustrated environments 100, one or more applications 120 have corresponding projects 122, data types 124, source code 126, markup 128 expressions 130, and visual 132 constructs 134 with properties 136. Software development tools 138 such as compilers, debuggers, profilers, designers, and code editors assist with software development by producing, analyzing, and/or transforming code 126. The code 126, tools 138, and other items shown in the Figures and/or discussed in the text, may each reside partially or entirely within one or more hardware media 112, thereby configuring those media for technical effects which go beyond the "normal" (i.e., least common denominator) interactions inherent in all hardware-software cooperative operation. In addition to processors 110 (CPUs, ALUs, FPUs, and/or GPUs), memory/storage media 112, display(s) 140, and battery(ies), an operating environment may also include other hardware, such as buses, power supplies, wired and wireless network interface cards, and accelerators, for instance, whose respective operations are described herein to the extent not already apparent to one of skill. CPUs are central processing units, ALUs are arithmetic and logic units, FPUs are floating point processing units, and GPUs are graphical processing units.

A given operating environment 100 may include an Integrated Development Environment (IDE) 142 which provides a developer with a set of coordinated software development tools 138 such as compilers, source code editors, profilers, debuggers, and so on. In particular, some of the suitable operating environments for some embodiments include or help create a Microsoft® Visual Studio® development environment (marks of Microsoft Corporation) configured to support program development. Some suitable operating environments include Java® environments (mark of Oracle America, Inc.), and some include environments which utilize languages such as C++ or C# ("C-Sharp"), but teachings herein are applicable with a wide variety of programming languages, programming models, and programs, as well as with technical endeavors outside the field of software development per se.

One or more items are shown in outline form in FIG. 1 to emphasize that they are not necessarily part of the illustrated operating environment, but may interoperate with items in the operating environment as discussed herein. It does not follow that items not in outline form are necessarily required, in any Figure or any embodiment.

Systems

Figure 2:
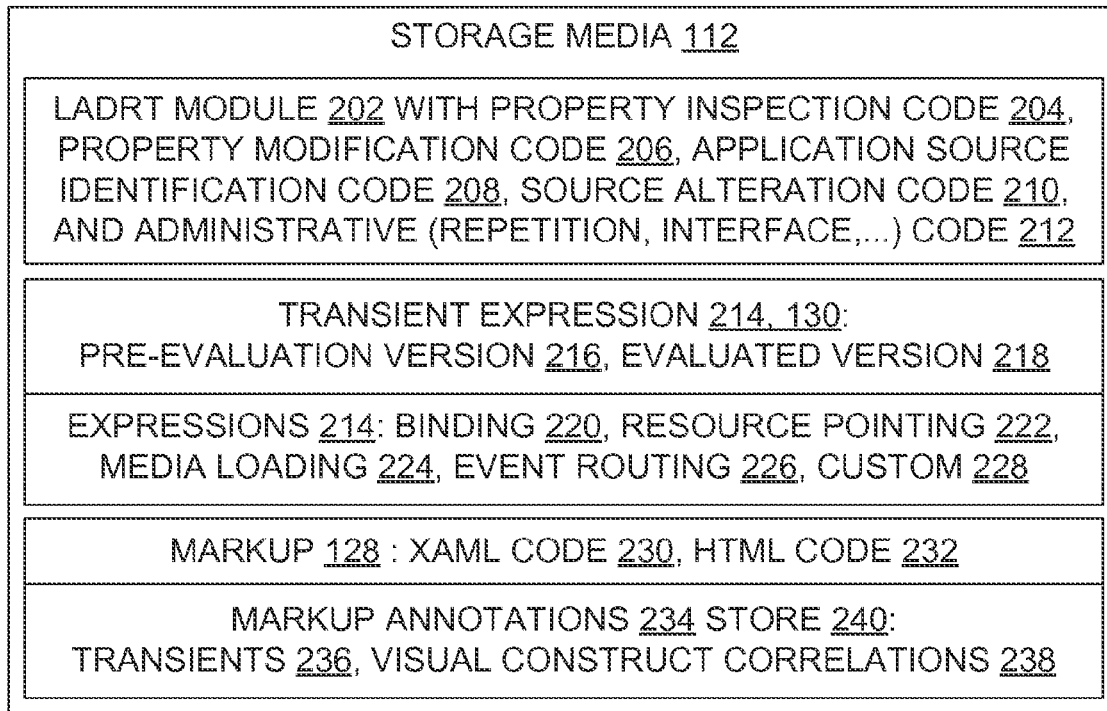
FIG. 2 is a block diagram illustrating aspects of an example architecture for troubleshooting application visuals.
Figure 3:
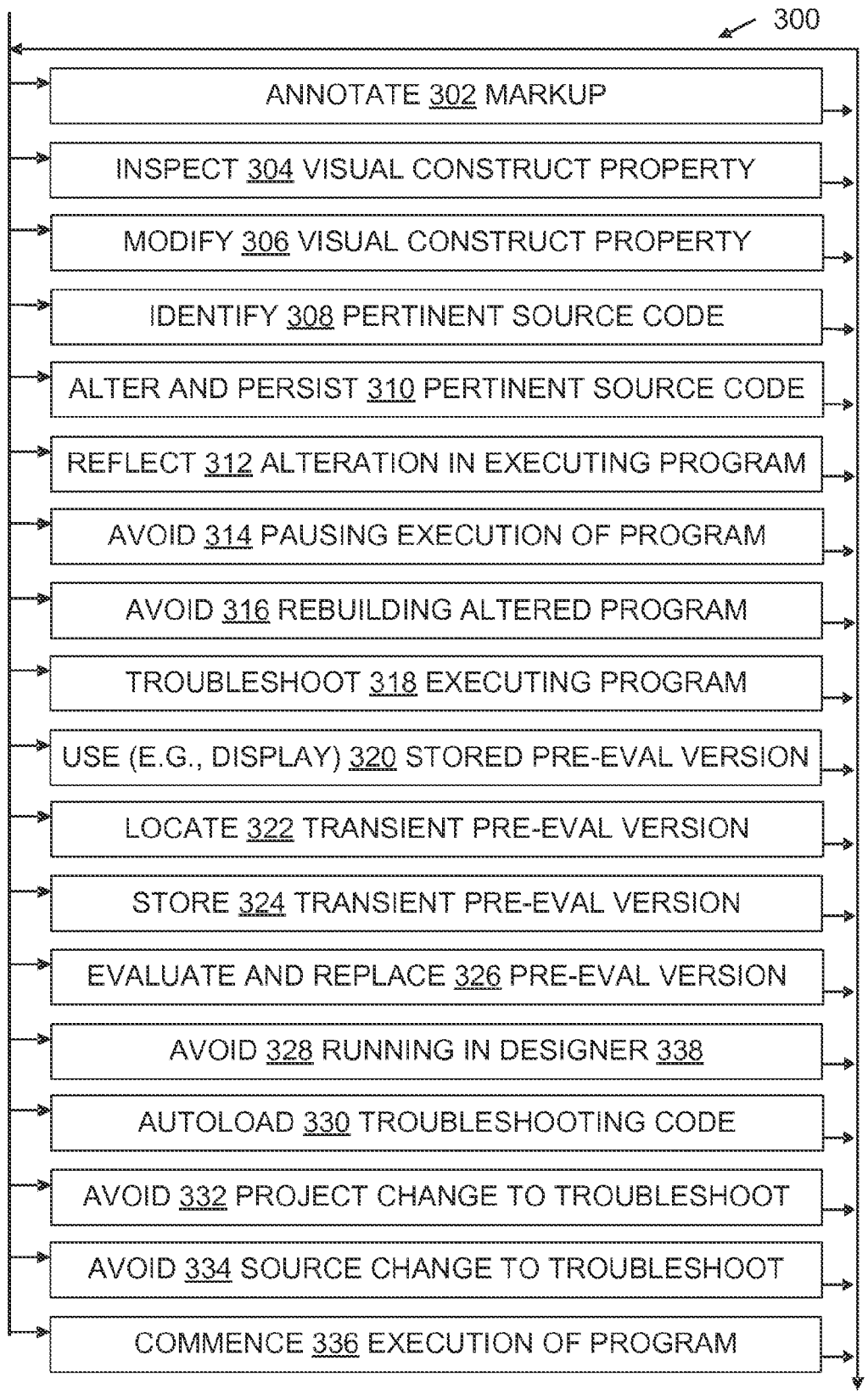
FIG. 3 is a flow chart illustrating steps of some process and configured storage medium embodiments for troubleshooting application visuals.

FIG. 2 illustrates aspects of an architecture which is suitable for use with some embodiments. A live authoring diagnostics round trip module (LADRT module) includes visual construct property inspection code 204, visual construct property modification code 206, application source identification code 208, application source alteration code 210, and administrative code 212. Code 212 includes, for example, repetition code 212 which allows repeated execution of the codes 204-210 under a developer's control (or under the control of a script or other automated user 104), and in some embodiments includes interface code 212 which interfaces between an IDE 142 and functionalities codes 204-210. In some embodiments, part of this LADRT module resides in a live running application and some parts are hosted in an IDE or implemented as a standalone executable, for example.

Expressions 130 in a markup 128 may include transient expressions 214. Transient expressions 214 take two forms, namely before and after their evaluation. Before being loaded and evaluated, a pre-evaluation version 216 of the transient expression 214 is stored in the markup 128, generally on disk. After being evaluated to support application 120 execution, an evaluated version 218 of the transient expression 214 is stored in the memory 112, often in RAM. Examples of transient expressions 214 include expressions for binding 220, for pointing 222 to resources. Some examples of other troubleshooting components that could be a part of LADRT-equipped embodiment include code for troubleshooting media load expressions and/or troubleshooting event routing expressions. Some custom 228 expressions (those written by application developers) are also transient expressions 214. The markup 128 may include XAML code 230, HTML code 232, and/or code written in other markup languages. Markup annotations 234 include annotations 236 which store transient pre-evaluation versions, and annotations 238 which correlate source code 126 with visual constructs 134.

With reference to FIGS. 1 and 2, some embodiments provide a computer system 102 with a logical processor 110 and a memory medium 112 configured by circuitry, firmware, and/or software to provide technical effects such as markup annotations 234, 236 that store transient expressions 214, markup annotations 234, 238 that correlate visual construct properties 136 with source code 126, and/or coordinated property 136 and source code 126 alterations without an application 120 rebuild, directed at technical problems described above.

Some embodiments provide a system 102 for troubleshooting live applications 120. The system 102 includes a display 140, at least one logical processor 110, and a memory 112 in operable communication with the logical processor(s) 110. An application program 120 resides at least partially in the memory 112 and is being executed by the logical processor 110. A markup 128 has been or is being loaded in the memory 112 by the application program, such as a XAML or HTML markup 128. An application visual 132 rendered on the display includes at least one visual construct 134 defined by the markup 128.

In some embodiments, a live authoring diagnostics round trip module 202 ("LADRT module") includes code for execution by the logical processor to provide troubleshooting functionality without pausing execution of the application program (that is, without requiring a debugger or other breakpoint tool 138, and without exiting or halting the application program). Specifically, in some embodiments the LADRT module includes the following: (a) a visual construct property inspection functionality code 204 which upon execution inspects at least one property 136 of at least one visual construct 134; (b) a visual construct property modification functionality code 206 which upon execution modifies at least one property 136 of at least one visual construct 134; (c) a source code identification functionality code 208 which upon execution identifies an application program source code 126 that pertains to a selected visual construct 134; and (d) a source code alteration functionality code 210 which upon execution alters application program source code 126 that is identified as pertaining to the visual construct 134.

In some embodiments, the LADRT module 202 includes code which upon execution makes an alteration to the application visual 132 within the application program while the full application program is executing (live, e.g., not in a designer tool 138). The change is serialized back to the application program source code 126 by the source code alteration functionality code 210, thus helping developers 104 stay focused.

Some embodiments include an integrated development environment 142 (IDE), and the LADRT module 202 includes code which upon execution makes an alteration to the application visual 132 within the application program within the IDE while the live application program is executing. The change is reflected in real time in the executing application program, e.g., by an altered display 140 rendering, thus helping developers 104 stay focused.

Some embodiments include a markup annotation 234 which correlates the visual construct 134 with a markup portion representing the visual construct. In some embodiments, the markup 128 includes XAML code 230, or HTML code 232, or both. In some, a markup annotation 236 preserves a pre-evaluation version 216 of an expression 130 in the markup that was subsequently replaced by an evaluated version 218 of the expression during execution of the application 120, such as a binding expression 220, an expression 222 which points to a resource, or a custom expression 228 written by an application developer, for example. Storing and using pre-evaluation versions 21 helps developers 104 diagnose application visual 132 issues which involve transient expressions 214.

In some situations, a debugger tool 138 and/or a source code editor tool 138 are also present, but they operate concurrently and independently of the LADRT module 202, in the sense that LADRT module functionality does not require their presence and their functionality does not require the presence of the LADRT module. For convenience, the LADRT module 202 may be automatically loaded in conjunction with commencing execution of the full application program.

In some embodiments peripherals 106 such as human user I/O devices (screen, keyboard, mouse, tablet, microphone, speaker, motion sensor, etc.) will be present in operable communication with one or more processors 110 and memory. However, an embodiment may also be deeply embedded in a technical system, such that no human user 104 interacts directly with the embodiment. Software processes may be users 104.

In some embodiments, the system includes multiple computers connected by a network. Networking interface equipment can provide access to networks 108, using components such as a packet-switched network interface card, a wireless transceiver, or a telephone network interface, for example, which may be present in a given computer system. However, an embodiment may also communicate technical data and/or technical instructions through direct memory access, removable nonvolatile media, or other information storage-retrieval and/or transmission approaches, or an embodiment in a computer system may operate without communicating with other computer systems.

Some embodiments operate in a "cloud" computing environment and/or a "cloud" storage environment in which computing services are not owned but are provided on demand. For example, source code 126 and/or markup 128 may be on multiple devices/systems 102 in a networked cloud, annotations 234 and/or LADRT module 202 code may be stored on yet other devices within the cloud, and the LADRT module 202 may configure the display 140 on yet other cloud device(s)/system(s) 102.

Processes

Figure 4:
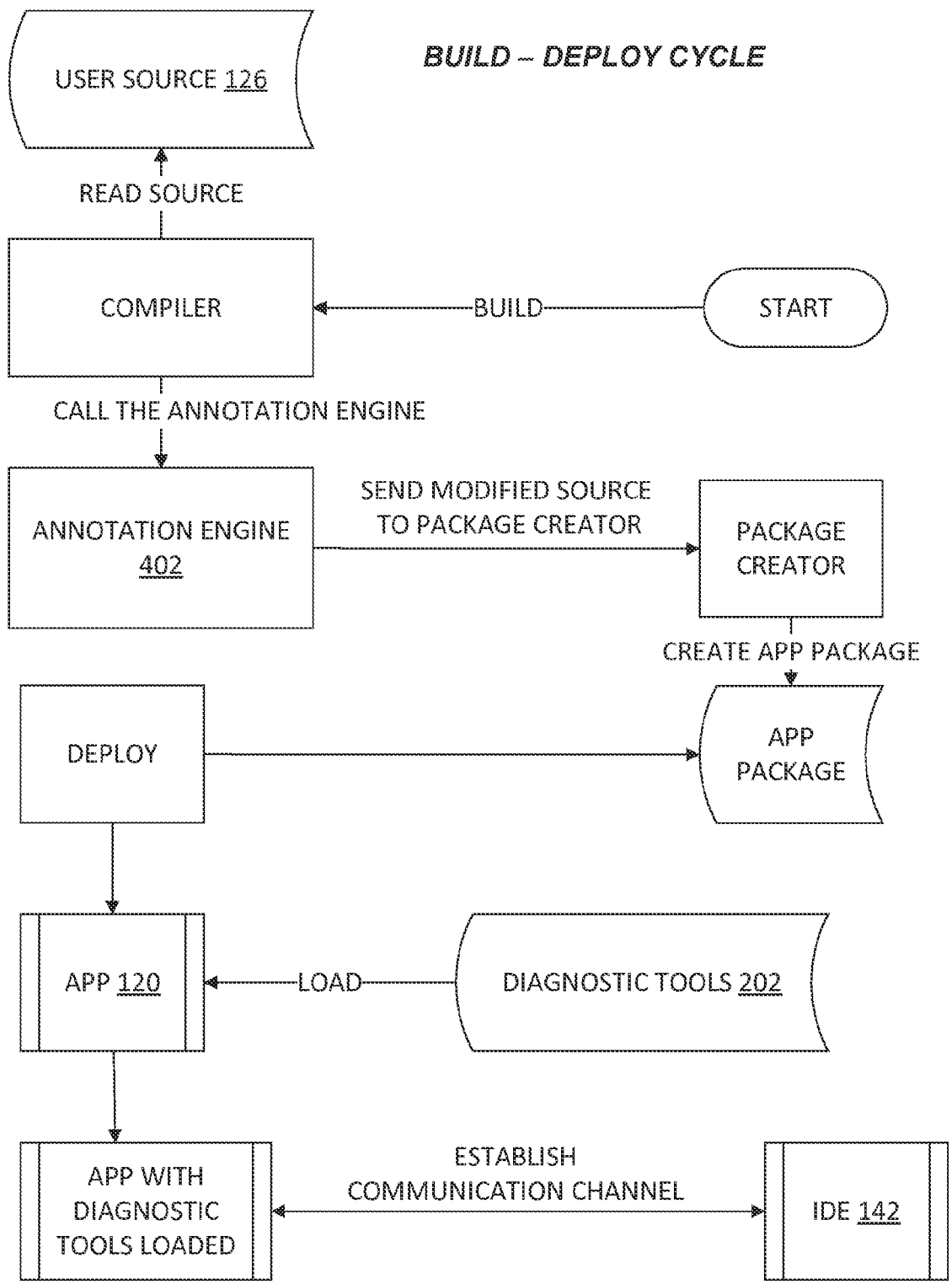
FIG. 4 is a data flow diagram illustrating a build-deploy cycle, including an application visuals markup annotation engine, an application with some application visual diagnostic tools loaded, and other aspects of application visual troubleshooting in some embodiments.
Figure 5:
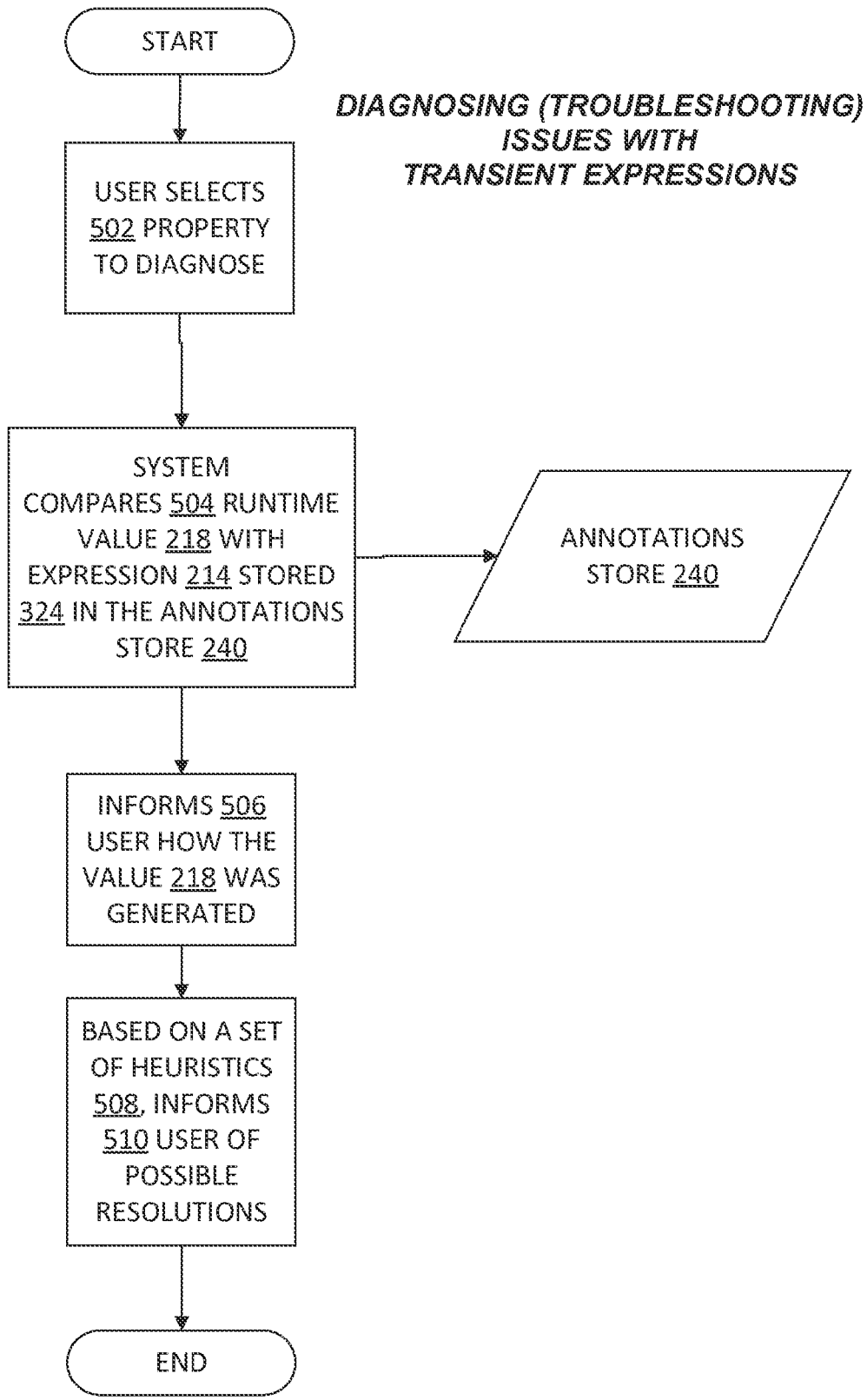
FIG. 5 is a data flow diagram illustrating aspects of application visual transient expression troubleshooting in some embodiments.
Figure 6:
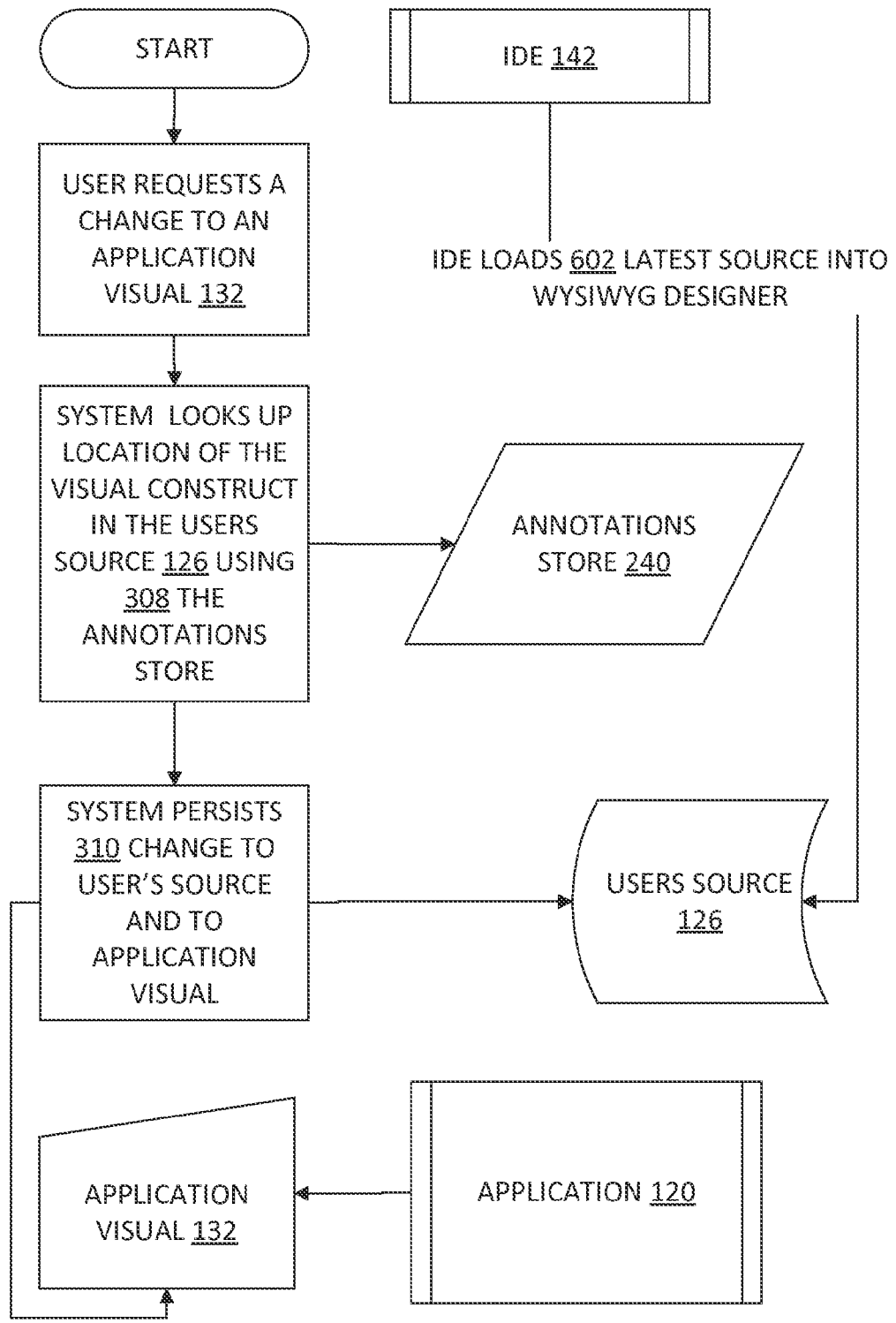
FIG. 6 is a data flow diagram illustrating aspects of persisting changes to source code while troubleshooting application visuals in some embodiments.

FIGS. 3 through 6 illustrate aspects of some process embodiments. Technical processes shown in the Figures or otherwise disclosed may be performed in some embodiments automatically, e.g., by LADRT module 202 under control of a script or otherwise requiring little or no contemporaneous live user input. Processes may also be performed in part automatically and in part manually unless otherwise indicated. In a given embodiment zero or more illustrated steps of a process may be repeated, perhaps with different parameters or data to operate on. Steps in an embodiment may also be done in a different order than the top-to-bottom order that is laid out in a flowchart 300 in FIG. 3. Steps may be performed serially, in a partially overlapping manner, or fully in parallel. The order in which flowchart 300 and/or steps shown in FIGS. 4-6 are traversed to indicate the steps performed during a given process may vary from one performance of the process to another performance of the process. The flowchart traversal order and other step order may also vary from one process embodiment to another process embodiment. Steps may also be omitted, combined into single steps, combined across Figures, renamed, regrouped, or otherwise depart from the illustrated flows, provided that the process performed is operable and conforms to at least one claim.

Examples are provided herein to help illustrate aspects of the technology, but the examples given within this document do not describe all possible embodiments. Embodiments are not limited to the specific implementations, arrangements, displays, features, approaches, or scenarios provided herein. A given embodiment may include additional or different technical features, mechanisms, and/or data structures, for instance, and may otherwise depart from the examples provided herein.

Some embodiments provide steps for troubleshooting 318 an executing application outside a designer. Some embodiments inspect 304 visual construct properties, and then modify 306 a property of a visual construct of an application visual of the application program while the application program is executing, without pausing 314 execution of the application program, thereby creating a property modification. The visual construct is defined by an application markup, such as a XAML or HTML markup, for instance. The embodiments identify 308 source code to be altered 310 by using a markup annotation which correlates the visual construct with a portion of the markup representing the visual construct. Then they persist 310 the property modification into a source code alteration of the application program while the application program is executing, without pausing 314 execution of the application. Some embodiments reflect 312 the source code alteration in the executing application without rebuilding 316 the application, thus promoting steady developer focus on the visuals. Markup is annotated 302 before the application program begins executing.

In some embodiments, running the application 120 in a designer tool 338, 138 is avoided 328 by using LADRT module code. Troubleshooting 318 while executing the application differs from running a designer 338 because in executing the live application, all code of the application defined by a developer 104 of the application (i.e., full application code) is accessible to the processor(s) 110, whereas in running a designer 338 one or more data types 124 in the code of the application defined by the developer would be replaced by designer 338 data types, e.g., to facilitate editing in the designer.

Troubleshooting 318 can be performed in some embodiments without requiring 332 an application program project 122 change, and without requiring 334 application source code 126 changes to support the LADRT module. Although source code may be changed to resolve issues diagnosed using the LADRT module, the LADRT module itself can be loaded and used without requiring 334 an application program source code change to make its functionalities available to a developer. In some embodiments, obtaining complete functionality of the LADRT module relies on the annotation store.

Some embodiments troubleshoot 318 a transient expression 214 in the markup while the application program is executing, by using 320 a pre-evaluation version of the transient expression that was subsequently replaced 326 by an evaluated version while the application program is executing. In some embodiments, troubleshooting 318 includes locating 322 a transient expression in a markup, storing 324 in a digital memory a copy of the transient expression prior to evaluating 326 the transient expression, commencing 336 execution of the full application program 120 by at least one processor in a computing environment, evaluating 326 the transient expression of the markup to support execution of the application program (thus replacing the located transient expression by an evaluated expression), inspecting 304 at least one property of at least one visual construct which is defined by the markup, and using 320 the stored transient expression. For example, the stored transient expression can be used 320 by displaying it within a software tool based on the LADRT module 202, thereby providing information about the markup during execution of the application program even though the information is not presently available in the executing application program. The LADRT module 202 can be automatically loaded 330 when the application execution commences 336. In some embodiments, troubleshooting 318 a transient expression 214 includes loading troubleshooting code 202, locating 322 a stored 324 pre-evaluation version 216 of the transient expression, getting the evaluated version 218 of the transient expression, comparing 504 the pre-evaluation version 216 to the evaluated version 218, informing 506 the user how the expression 214 was evaluated, and informing 510 the user of possible resolutions.

Configured Media

Some embodiments include a configured computer-readable storage medium 112. Medium 112 may include disks (magnetic, optical, or otherwise), RAM, EEPROMS or other ROMs, and/or other configurable memory, including in particular computer-readable media (as opposed to mere propagated signals). The storage medium which is configured may be in particular a removable storage medium 114 such as a CD, DVD, or flash memory. A general-purpose memory, which may be removable or not, and may be volatile or not, can be configured into an embodiment using items such as an LADRT module 202, annotations store 240 with annotations 236 containing pre-evaluation versions 216 of transient expressions 214 and/or annotations 238 containing correlations between visual constructs 134 and source code 126, in the form of data 118 and instructions 116, read from a removable medium 114 and/or another source such as a network connection, to form a configured medium. The configured medium 112 is capable of causing a computer system to perform technical process steps for troubleshooting markup-defined application visuals as disclosed herein. FIGS. 1 through 6 thus help illustrate configured storage media embodiments and process embodiments, as well as system and process embodiments. In particular, any of the process steps illustrated in FIGS. 3 through 6, or otherwise taught herein, may be used to help configure a storage medium to form a configured medium embodiment.

Additional Examples

Additional details and design considerations are provided below. As with the other examples herein, the features described may be used individually and/or in combination, or not at all, in a given embodiment.

Those of skill will understand that implementation details may pertain to specific code, such as specific APIs and specific sample programs, and thus need not appear in every embodiment. Those of skill will also understand that program identifiers and some other terminology used in discussing details are implementation-specific and thus need not pertain to every embodiment. Nonetheless, although they are not necessarily required to be present here, these details are provided because they may help some readers by providing context and/or may illustrate a few of the many possible implementations of the technology discussed herein.

The following discussion is derived from documentation for Live Authoring and Diagnostics, which is part of a Modern Platforms endeavor by Microsoft Corporation. Aspects of Live Authoring and Diagnostics software and/or documentation are consistent with or otherwise illustrate aspects of the embodiments described herein. However, it will be understood that Live Authoring and Diagnostics documentation and/or implementation choices do not necessarily constrain the scope of such embodiments, and likewise that Live Authoring and Diagnostics and/or its documentation may well contain features that lie outside the scope of such embodiments. It will also be understood that the discussion below is provided in part as an aid to readers who are not necessarily of ordinary skill in the art, and thus may contain and/or omit details whose recitation below is not strictly required to support the present disclosure.

As illustrated in FIG. 4 and described elsewhere herein, during a build-deploy cycle in some embodiments, an annotation engine 402 annotates 302 an application's markup 128 with custom annotations 234, 238 that help correlate visual constructs 134 with their markup representations. This enables the embodiment to persist 310 back to the source 126 changes that are made in the running application. Those changes in the source are reflected 312 in the running application in subsequent diagnostic sessions, thus indicating a "round trip" for the changes. For example, in some embodiments annotation takes the form of a key value expression such as:
SourceAnnotation.SourceLineNumer="112"
SourceAnnotation.PreEvalExpression="{Binding X}"

In addition, transient expressions 214 in the markup 128 that can be evaluated away by the runtime are also stored 324 using this mechanism so the embodiment can display 320, evaluate, and/or otherwise use this pre-evaluation version 216 of the transient expression separately even after this version 216 no longer exists in the same form in the running application. For example, binding expressions 220 in markup 128 are converted to direct values during application load. If there is an issue in a binding expression, comparing values to the pre-evaluation version 216 stored 324 by the embodiment helps developers pinpoint the exact reason for the problematic issue with certainty.

In some embodiments, when the application 120 is deployed the embodiment auto loads 330 into the running application an implementation of diagnostic tools and interfaces (LADRT module 202) to interact with the IDE. This approach avoids 332 project changes and avoids 334 source changes from the user 104 that would otherwise be performed to make the functionalities codes 204-210 accessible to the developer through the IDE 142. After the application 120 is loaded, a user 104 can choose to invoke the diagnostic tools either through the use of a diagnostics command bar that is rendered on the running application 120 or by means of a keyboard shortcut, for example.

In some embodiments, these diagnostic tools allow users 104 to inspect 304 a Visual Tree of the running application, and allow the user to modify 306 the properties 136 of the visual constructs 134 using a feature-rich property editor. Inspection 304 and modification 306 may be accomplished using familiar tools and techniques, which are functionally integrated with annotation-guided identification 308 and alteration 310 of pertinent source code. The modifications are persisted 310 back into the source of the application using the information available in the annotations store. For example, suppose a user makes a change to width to an element using the LADRT module. One embodiment checks the annotation store to see where this element is stored, reads the value of the key SourceAnnotation.SourceLineNumer="112" associated with the element, and thus determines which line of source to change. These changes are also reflected 312 in real time in the application as well as on the WYSIWYG design surface if a designer 338 is being used. Some embodiments can also detect failures in scenarios like Media load and playback, Binding (e.g., TemplateBinding), and Event routing using these mechanisms, and help the user 104 find possible solutions to these issues by displaying pre-evaluation versions 216, binding 220, 226 transient expressions 214 from the annotations store 240. One of the many possible examples of a transient expression looks like the following in markup before loading
Width="{Binding Width, Source={StaticResource MyModel}"

but at runtime is evaluated to a numeric value. The terms transient value and transient expression are used interchangeably herein. As a Media load example, in response to <Image Source=http://myimage dot png/> some embodiments can hook up to MediaLoad and MediaFailed event handlers in runtime of the Image element and listen for these events to fire. If the Image fails to load, MediaFailed will get fired, and the user can be notified that this image load failed. It will be understood that "dot" represents a period in the address above, which is disabled per USPTO procedure and not intended to incorporate any material by reference.

Some embodiments allow users 104 to easily discover which styles and templates can best be used to modify the look and feel of a control. For example, when the user selects the checked mark in an item in the ListView control an embodiment can automatically import the necessary styles into the application and the user's project 122 and allow the user to seamlessly edit these styles on the fly. The user is no longer compelled to know from tedious manual investigation which style in a complex control maps to a particular part of its visual. Likewise, developers 104 may inspect the live visual tree to help identify common layout issues, such as layout in a ListView control. Developers can also see the changing performance characteristics of their apps without having to context switch to a different application (e.g., debugger or code editor) while running their app 120 through its paces.

Some embodiments use mechanisms described herein to provide one or more of the following functionality codes.

Visual Tree Viewer code 204: Users can see the live visual tree of the current visual of the running application.

Live Property Viewer code 204: Users can view the value of any property of an element in the running application.

Navigate to Source code 208: Users can (when applicable) trace the value of a property of their live element to their source.

Diagnostics Target Options code 212: Users can use the visual debugging and authoring feature set on a Simulator\Emulator and on a Local Machine.

Databinding Diagnostics codes 204, 208, 212: Users can identify failed bindings in the current view and be informed of possible solutions to the issue.

Live Edit Properties codes 204, 206, 210: Users can add and otherwise modify inline properties of any visual elements and persist the new values back to the source, e.g., from within a Microsoft® Visual Studio® or Microsoft® Expression Blend® environment (marks of Microsoft Corporation).

Live Edit Persist to Source codes 206, 208, 210: Any change to the markup 128 consumed by the current view (inline, resources, and templates) can be persisted in the running app 120, such that on navigating back to the view the changes are still being reflected 312.

View Persistence codes 204, 206, 212: Users can view changes they made even after navigating away from the view and then returning to it.

Live Edit Resources codes 204, 206: Users can edit resources that are set to properties 136. The new value of the resource is reflected across all the instances of the controls consuming this property in the current visual.

Live Edit Templates codes 204, 206, 212: Users can create and edit templates that are set to controls in the current visual. The new rendition of the template is reflected across all the instances of the controls consuming using this template in the current visual.

Live Edit Visual State Manager (VSM) codes 204, 206: Users can edit properties of the selected visual encapsulated in a VSM and preview the changes instantly.

App Inspection Guidelines code 212: Users can use tools on the running app, such as rulers, typographical grid, overlays, pan and zoom, to help them conform to application user interface guidelines.

Authoring codes 204-212: Users can create new templates for visuals they are editing, add new elements to the logical tree for the visual they are editing, and use all the designer 338 authoring tools against the running application 120.

Event Diagnostics codes 204-212: Users can identify the set of events fired for any given user action and trace its execution, on a local or remote device. Users can also attach and use XAML Visual Debugging tools that have already been instrumented.

With respect to markup annotation, some embodiments provide attach-to-app code 212 to permit users to launch an application with LADRT module inspection and diagnostic tools attached to the application automatically, without having to modify their application 120 source.

With respect to the LADRT module 202 and Visual Tree Viewer code 204 in particular, some embodiments provide code with some or all of the following features. View code provides a hierarchical view of a Visual Tree, including a Tree view with collapsible nodes. Differentiate Logical and Dynamic nodes code uses different styling for Logical and Dynamic nodes. Navigate to Source code 204, 208 synchronizes code selection in an IDE to a selected element in the visual tree. User Interface plus Shortcuts code supports Showing elements in Popup and its derived types, and/or allows a user to get the UI out of the way without hiding it. A Visual Tree viewer supports inspection of pop up based controls. Show or Hide code adds gestures and button support allowing users to show and hide the panel. Element Count for Sub tree code shows the number of elements in a sub tree in the visual tree.

With respect to LADRT module 202 and Property Visualizer code 204 in particular, some embodiments provide code implementing a Property Visualizer in the running application 120, with some or all of the following features. Name Value Pair View code implements a flat list of Name and Value pairs, including visualizers for a select list of properties, e.g., Brush and Color. Common properties list code is controlled by default and\or user settings to show the properties deemed most useful, e.g. Appearance, Layout, and very common properties specific to frequently used control types. All Property list code is controlled by toggle and\or user settings to show all properties of the current selected element. Differentiate Values code uses different styling for markup values and values set by runtime. Navigate to Source code 204, 208 and User Interface plus Shortcuts code 204 perform as indicated elsewhere herein.

With respect to LADRT module 202 and Navigate to Source code 204, 208 in particular, some embodiments provide code which synchronizes the code selection and the designer scope to the selected element. Some include a Property Inspection Integration feature whereby users can synchronize code in an IDE 142 to a property from the Property Visualizer code described above. Some include a Visual Tree Integration feature whereby users can synchronize code in an IDE 142 to an element when applicable from the Visual tree viewer. The designer 338 will be opened based on user preference and a markup editor will highlight the selected element and the document outline will set its selection to element selected (but not in source view). A Navigate to Source-Inline feature allows users to navigate to the inline value of a property or an element. A Navigate to Source-Resource feature allows users to navigate to a resource the property is set to. This may be applicable to templates as well. A Navigate to Source-Animation feature allows a user to navigate to an animation that modifies the property the user is interested in. A Scope synchronization feature operates such that if the user selects an element within a template the designer will be scoped to template editing mode and the appropriate type of scoping will be applied (In place or Out of place). With a Host Integration feature, an IDE user can set synchronization to the currently selected element in the running app without having to switch to the app. With Automatic synchronization, a user can set an option whereby any selection on the running app will automatically synchronize the selection in an IDE 142 such as Microsoft® Visual Studio® or Microsoft® Expression Blend® environment (marks of Microsoft Corporation).

With respect to LADRT module 202 and Direct Element Selection code 204 in particular, some embodiments provide code which allows users to select an element directly on the running application 120. This code will synchronize the selection across the Visual Tree viewer and the Live Property Inspector in the running application. Element Selection code allows a user to select an element on the running application without interacting with the application. Also provided are a user interface for the selection tool and Shortcuts for equipping the tool. One version allows keyboard selection in the running application by travelling down the tree. An Adorner shows the selected element. Elements selected have an adorner around them to signify selection.

With respect to LADRT module 202 and Databinding Diagnostics code 204, 236 in particular, some embodiments provide code which helps users identify failed bindings and provides contextual information that will help them resolve this issue. When code to Highlight elements with failed bindings in the Visual Tree finds or is given elements that have failed bindings, that is brought to the attention of the user by highlighting in the tree, and a filtered view may be provided as well. When code to Highlight properties with failed bindings in Property Visualizer finds or is given properties that have failed bindings, that is brought to the attention of the user by highlighting in the Property Visualizer, and a filtered view may be provided as well. When code to Highlight elements with failed bindings in an IDE finds or is given elements that have failed bindings, that is brought to the attention of the user by highlighting in the Runtime, e.g., by drawing an adorner. Code to Show contextual Information operates when inspecting the property to show the data context in scope, and run some rules that might help the user identify the cause of failed binding, e.g., spelling mistakes.

With respect to LADRT module 202 and Shell Integration code 212 in particular, some embodiments provide code which integrate LADRT module 202 to a diagnostics hub as well as parts of the shell in Microsoft® Visual Studio® or Microsoft® Expression Blend® environment (marks of Microsoft Corporation). Such code provides commands within the diagnostics hub and/or within a Run\Debug Menu to launch LADRT module 202 tools.

As illustrated in FIG. 5, in some embodiments a user selects 502 a property 136 to diagnose. The system 102 compares 504 the runtime value (the property's evaluated version 218) with the pre-evaluated version 218 of the expression 214, 236 that was stored 324 in the annotations store 240. By displaying the two versions 216 and 218, and summarizing the transition steps between them, the system 102 informs 506 the user 104 how the runtime value 218 was generated. Based on a set of heuristics 508 (such as identifying possibly miss-spelled identifiers, identifying possibly overloaded identifiers, and identifying undefined identifiers), the system informs 510 the user of potential resolutions to the issue, such as possible alternative expressions the user may have intended to use.

As illustrated in FIG. 6, in some embodiments a user 104 requests from a system 102 a change to an application visual 132, e.g., through LADRT module 202 property modification code 206. The system looks up the location of the visual construct in the user's source code 126, e.g., through source identification code 208 which uses 308 correlations 238 in the annotation store 240. Then the system persists 310 (e.g., by storing in non-volatile memory 112) the change to the user's source and to the application visual. If an IDE 142 is being used, the IDE can load 602 the updated source 126 into a WYSIWYG designer 338.

In one example scenario, a developer 104 notices problems with a displayed Leaderboard visual 132 of an application 120; participant scores are not showing and participant names are being cut off. To troubleshoot these issues, the developer runs the application 120 with a visual diagnostics option that invoked a LADRT module 202. Upon running the application, an error dialog is displayed on a TextBlock construct that should have displayed the score: "Binding error-Scre property does not exist in data context Tankster.XBoxLive.Data— did you mean 'Score'—List of other properties in this data context=FinalScore". The developer uses a Synchronize to Source feature to navigate to the erroneous binding; on navigating to the source, the enhanced designer synchronizes the scope and selection to the failed binding. Then the developer fixes the error by changing "Scre" to "Score" in the source 126.

To troubleshoot the cutting short of displayed names in this scenario, the developer selects the data template item exhibiting that misbehavior, using the in-application visual tree viewer feature to fine-tune selection to the correct element. The developer inspects 304 the value of the Text property using an in-app property visualizer, and formulates a resolution of the error—either trim or wrap the text. The developer invokes the Synchronize to Source command to navigate to the source code for the Text property, and makes the correction.

CONCLUSION

Although particular embodiments are expressly illustrated and described herein as processes, as configured media, or as systems, it will be appreciated that discussion of one type of embodiment also generally extends to other embodiment types. For instance, the descriptions of processes in connection with FIG. 3 also help describe configured media, and help describe the technical effects and operation of systems and manufactures like those discussed in connection with other Figures. It does not follow that limitations from one embodiment are necessarily read into another. In particular, processes are not necessarily limited to the data structures and arrangements presented while discussing systems or manufactures such as configured memories.

Reference herein to an embodiment having some feature X and reference elsewhere herein to an embodiment having some feature Y does not exclude from this disclosure embodiments which have both feature X and feature Y, unless such exclusion is expressly stated herein. The term "embodiment" is merely used herein as a more convenient form of "process, system, article of manufacture, configured computer readable medium, and/or other example of the teachings herein as applied in a manner consistent with applicable law." Accordingly, a given "embodiment" may include any combination of features disclosed herein, provided the embodiment is consistent with at least one claim.

Not every item shown in the Figures need be present in every embodiment. Conversely, an embodiment may contain item(s) not shown expressly in the Figures. Although some possibilities are illustrated here in text and drawings by specific examples, embodiments may depart from these examples. For instance, specific technical effects or technical features of an example may be omitted, renamed, grouped differently, repeated, instantiated in hardware and/or software differently, or be a mix of effects or features appearing in two or more of the examples. Functionality shown at one location may also be provided at a different location in some embodiments; one of skill recognizes that functionality modules can be defined in various ways in a given implementation without necessarily omitting desired technical effects from the collection of interacting modules viewed as a whole.

Reference has been made to the figures throughout by reference numerals. Any apparent inconsistencies in the phrasing associated with a given reference numeral, in the figures or in the text, should be understood as simply broadening the scope of what is referenced by that numeral. Different instances of a given reference numeral may refer to different embodiments, even though the same reference numeral is used.

As used herein, terms such as "a" and "the" are inclusive of one or more of the indicated item or step. In particular, in the claims a reference to an item generally means at least one such item is present and a reference to a step means at least one instance of the step is performed.

Headings are for convenience only; information on a given topic may be found outside the section whose heading indicates that topic.

All claims and the abstract, as filed, are part of the specification.

While exemplary embodiments have been shown in the drawings and described above, it will be apparent to those of ordinary skill in the art that numerous modifications can be made without departing from the principles and concepts set forth in the claims, and that such modifications need not encompass an entire abstract concept. Although the subject matter is described in language specific to structural features and/or procedural acts, it is to be understood that the subject matter defined in the appended claims is not necessarily limited to the specific technical features or acts described above the claims. It is not necessary for every means or aspect or technical effect identified in a given definition or example to be present or to be utilized in every embodiment. Rather, the specific features and acts and effects described are disclosed as examples for consideration when implementing the claims.

All changes which fall short of enveloping an entire abstract idea but come within the meaning and range of equivalency of the claims are to be embraced within their scope to the full extent permitted by law.

What is claimed is:

1. A computer system for troubleshooting executing application programs, the computer system comprising:
    a display;
    a logical processor;
    a memory in operable communication with the logical processor;
    an application program residing at least partially in the memory and being executed by the logical processor;
    a markup loaded in the memory by the application program;
    a markup annotation which preserves a pre-evaluation version of an expression in the markup that was subsequently replaced by an evaluated version of the expression during execution of the application program;
    an application visual which is rendered on the display and includes at least one visual construct defined by the markup;
    a live authoring diagnostics round trip module ("LADRT module") having the following functionality codes which upon execution by the logical processor provide the indicated functionality without pausing execution of the application program:
        (a) a visual construct property inspection functionality code which upon execution inspects at least one property of at least one visual construct;
        (b) a visual construct property modification functionality code which upon execution modifies at least one property of at least one visual construct;
        (c) a source code identification functionality code which upon execution identifies an application program source code that pertains to a selected visual construct, wherein a source code pertains to the visual construct when the source code specifies at least one of the following: creation of the visual construct, modification of the visual construct; and
        (d) a source code alteration functionality code which upon execution alters application program source code that is identified as pertaining to the visual construct.

2. The computer system of claim 1, wherein the LADRT module comprises code which upon execution makes an alteration to the application visual within the application program while the application program is executing, and wherein the change is serialized back to the application program source code by the source code alteration functionality.

3. The computer system of claim 1, further comprising an integrated development environment (IDE), wherein the LADRT module comprises code which upon execution makes an alteration to the application visual within the application program within the IDE while the application program is executing, and wherein the change is reflected in real time in the executing application program.

4. The computer system of claim 1, wherein the markup annotation correlates the visual construct with a markup portion representing the visual construct, and wherein the markup portion comprises at least one of the following:
    XAML code,
    HTML code.

5. The computer system of claim 1, wherein the markup annotation preserves a pre-evaluation version of at least one of the following markup expressions that was subsequently replaced by an evaluated version during execution of the application program:
    a binding expression;
    an expression which points to a resource.

6. The computer system of claim 1, further comprising at least one of the following tools which operate concurrently and independently of the LADRT module, in that LADRT module functionality does not require the presence of the tool and tool functionality does not require the presence of the LADRT module:
    a debugger tool;
    a source code editor tool.

7. The computer system of claim 1, wherein the markup annotation preserves a pre-evaluation version of a custom markup expression written by a user of the computer system that was subsequently replaced by an evaluated version during execution of the application program.

8. A computer-readable storage memory configured with data and with instructions that when executed by at least one processor causes the processor(s) to perform a technical process for troubleshooting an executing application program, the technical process comprising the steps of:

modifying a property of a visual construct of an application visual of the application program while the application program is executing and without pausing execution of the application program, thereby creating a property modification, the visual construct being defined by a markup;

identifying source code to be altered by using a markup annotation which correlates the visual construct with a portion of the markup representing the visual construct;

troubleshooting a transient expression in the markup while the application program is executing, by using a pre-evaluation version of the transient expression that was subsequently replaced by an evaluated version while the application program is executing; and persisting the property modification into a source code alteration of the application program while the application program is executing, without pausing execution of the application program, and after the step of identifying source code to be altered.

9. The computer-readable storage memory of claim 8, wherein the technical process further comprises reflecting the source code alteration in the executing application program without rebuilding the application program.

10. The computer-readable storage memory of claim 8, wherein the technical process further comprises annotating the markup with the markup annotation, before the application program is executing.

11. The computer-readable storage memory of claim 8, wherein the transient expression comprises at least one of: a binding expression, an expression which points to a resource.

12. The computer-readable storage memory of claim 8, wherein the technical process further comprises executing the application program, and the technical process is characterized in that executing the application program differs from running a designer because in executing the application program all code of the application program defined by a developer of the application program is accessible to the processor whereas in running a designer one or more data types in the code of the application program defined by the developer are replaced by designer data types to facilitate editing.

13. The computer-readable storage memory of claim 8, wherein the technical process further comprises operating at least one of the following tools concurrently and independently of a live authoring diagnostics round trip module ("LADRT module"), in that LADRT module functionality does not require the presence of the tool and tool functionality does not require the presence of the LADRT module:

a debugger tool;
a source code editor tool.

14. A technical process for troubleshooting an application program executing in a computing environment, the technical process comprising the steps of:

locating a transient expression in a markup;

storing in a digital memory a copy of the transient expression prior to evaluating the transient expression;

commencing execution of the full application program by at least one processor in the computing environment;

evaluating the transient expression of the markup to support execution of the application program, thereby replacing the located transient expression by an evaluated expression;

inspecting within a software tool at least one property of at least one visual construct which is defined by the markup;

modifying a visual construct property, which may be the property of the inspecting step and in other cases may be a different property, thereby creating a property modification without pausing execution of the application program; and displaying the stored transient expression within the software tool, thereby providing information about the markup during execution of the application program even though the information is not presently available in the executing application program.

15. The technical process of claim 14, wherein the transient expression comprises at least one of:

a binding expression;
an expression which points to a resource;
a custom expression written by a user of the computing environment.

16. The technical process of claim 14, wherein the markup comprises XAML code.

17. The technical process of claim 14, wherein the technical process is characterized in that executing the full application program differs from running a designer because in executing the full application program all code of the application program is accessible to the processor whereas in running a designer one or more data types in the code of the application program are replaced by designer data types.

18. The technical process of claim 14, wherein the technical process further comprises:

identifying source code to be altered by using at least one markup annotation which correlates the visual construct property with a portion of the markup; and persisting the property modification into a source code alteration of the application program while the application program is executing.

19. The technical process of claim 14, wherein the technical process further comprises automatically loading the software tool in conjunction with commencing execution of the full application program.

20. The technical process of claim 14, wherein the technical process steps are performed without requiring from any developer of the application program any of the following: an application program project change, an application program source code change.

* * * * *